United States Patent
Lee et al.

(10) Patent No.: US 9,246,189 B2
(45) Date of Patent: Jan. 26, 2016

(54) SECONDARY BATTERY INCLUDING ELECTROLYTE ADDITIVE

(71) Applicant: LG Chem, Ltd., Seoul (KR)

(72) Inventors: YounKyoung Lee, Seoul (KR); Tae Jin Park, Daejeon (KR); Daehong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/866,440

(22) Filed: Apr. 19, 2013

(65) Prior Publication Data

US 2013/0309562 A1    Nov. 21, 2013

(30) Foreign Application Priority Data

Apr. 19, 2012    (KR) .................. 10-2012-0040724

(51) Int. Cl.
| | |
|---|---|
| H01M 10/0564 | (2010.01) |
| H01M 10/0567 | (2010.01) |
| H01M 10/052 | (2010.01) |
| H01M 4/485 | (2010.01) |
| H01M 4/505 | (2010.01) |
| H01M 4/525 | (2010.01) |
| H01M 10/42 | (2006.01) |

(52) U.S. Cl.
CPC .......... *H01M 10/0564* (2013.01); *H01M 4/505* (2013.01); *H01M 10/052* (2013.01); *H01M 10/0567* (2013.01); *H01M 10/4235* (2013.01); *Y02E 60/122* (2013.01); *Y02T 10/7005* (2013.01); *Y02T 10/7011* (2013.01)

(58) Field of Classification Search
USPC .......................................... 429/188, 324, 326
See application file for complete search history.

(56) References Cited

U.S. PATENT DOCUMENTS

| | | | | |
|---|---|---|---|---|
| 6,074,776 | A * | 6/2000 | Mao et al. ........................ | 429/61 |
| 7,713,655 | B2 * | 5/2010 | Ha et al. ........................... | 429/99 |
| 2003/0118911 | A1 * | 6/2003 | Choy et al. ..................... | 429/326 |
| 2004/0028996 | A1 * | 2/2004 | Hamamoto et al. ............ | 429/61 |
| 2004/0053138 | A1 * | 3/2004 | Otterstedt et al. ............. | 429/307 |
| 2006/0024585 | A1 * | 2/2006 | Hamamoto et al. .......... | 429/326 |
| 2007/0141475 | A1 * | 6/2007 | Ahn et al. ..................... | 429/326 |
| 2011/0059365 | A1 * | 3/2011 | Meehan et al. .......... | 429/231.95 |
| 2011/0189550 | A1 * | 8/2011 | Zhao et al. .................... | 429/338 |
| 2011/0300433 | A1 * | 12/2011 | Kim .............................. | 429/159 |

FOREIGN PATENT DOCUMENTS

| | | | |
|---|---|---|---|
| JP | 2001064020 A | * | 3/2001 |
| JP | 2001-210324 | | 8/2001 |
| KR | 10-2008-0086288 A | | 9/2008 |
| KR | 29-2012-0030951 A | | 3/2012 |
| WO | WO 9804010 A1 | * | 1/1998 |

OTHER PUBLICATIONS

IPDL Machine Translation of the Detailed Description of JP 2001-210324 (Aug. 2001).*

* cited by examiner

*Primary Examiner* — Gregg Cantelmo

(74) *Attorney, Agent, or Firm* — Birch, Stewart, Kolasch & Birch, LLP

(57) ABSTRACT

Disclosed is a secondary battery including a cathode, an anode, and an electrolyte including a lithium salt and a non-aqueous organic solvent, wherein the electrolyte includes an electrolyte additive to be decomposed at 4.5 V or higher to less than 5.5 V vs. reduction voltage of $Li^+$.

7 Claims, 2 Drawing Sheets

SECONDARY BATTERY INCLUDING ELECTROLYTE ADDITIVE

TECHNICAL FIELD

The present invention relates to a secondary battery including a cathode, an anode, and an electrolyte including a lithium salt and a non-aqueous organic solvent, wherein the electrolyte includes an electrolyte additive that is decomposed at 4.5 V or higher to less than 5.5 V vs. reduction voltage of $Li^+$.

BACKGROUND ART

As mobile device technology continues to develop and demand therefor continues to increase, demand for secondary batteries as energy sources is rapidly increasing. Among these secondary batteries, lithium secondary batteries, which exhibit high energy density and operating potential, have long cycle lifespan, and have a low self-discharge rate, are commercially available and widely used.

In addition, as recent interest in environmental problems is increasing, research into electric vehicles (EVs), hybrid electric vehicles (HEVs), and the like that can replace vehicles using fossil fuels, such as gasoline vehicles, diesel vehicles, and the like, which are one of the main causes behind air pollution, is actively conducted. As a power source of EVs, HEVs, and the like, a nickel-metal hydride (Ni-MH) secondary battery is mainly used. However, research into lithium secondary batteries having high energy density, high discharge voltage, and high output stability is actively carried out and some of the lithium secondary batteries are commercially available.

A lithium secondary battery has a structure in which an electrode assembly, which includes: a cathode prepared by coating a cathode active material on a cathode current collector; an anode prepared by coating an anode active material on an anode current collector; and a porous separator disposed between the cathode and the anode, is impregnated with a lithium salt-containing non-aqueous electrolyte.

Such secondary batteries generate gas due to reaction between an electrode and an electrolyte due to various causes. Such gas may cause swelling of a battery and, in severe cases, leads to explosion.

Therefore, there is a need to develop a technology that can resolve the above-described problems.

DISCLOSURE

Technical Problem

Therefore, the present invention has been made to solve the above problems and other technical problems that have yet to be resolved.

As a result of a variety of extensive and intensive studies and experiments, the inventors of the present invention found that, as described below, when an additive that is decomposed at specific potential is used, a film is formed on a surface of an electrode, whereby generation of gas is prevented, thus completing the present invention.

Technical Solution

In accordance with one aspect of the present invention, provided is a secondary battery including a cathode, an anode, and an electrolyte including a lithium salt and a non-aqueous organic solvent, wherein the electrolyte includes an electrolyte additive that is decomposed at 4.5 V or higher to less than 5.5 V vs. reduction voltage of $Li^+$.

The electrolyte additive is decomposed at 4.5 V or higher to less than 5.5 V vs. reduction voltage of $Li^+$ and thus may form an electrode surface layer such as a solid electrolyte interface (SEI) film. Accordingly, the electrolyte additive may suppress oxidation of the electrolyte due to side reaction between an electrode and the electrolyte and thus prevent generation of gas and, furthermore, secondary battery safety may be achieved.

Thus, as the electrolyte additive is decomposed, a surface layer may be formed on a surface of at least one of the cathode and the anode of the secondary battery. Specifically, the surface layer may be formed on the cathode.

The amount of the electrolyte additive may be in the range of 0.1 to 1 wt %, for example, in the range of 0.1 to 0.6 wt %, based on a total weight of the electrolyte. When the amount of the electrolyte additive is too small, desired effects are not obtained. On the other hand, when the amount of the electrolyte additive is too large, conductivity of the electrolyte may be reduced, and decomposition of the electrolyte additive excessively occurs, which may increase internal resistance of the secondary battery.

The type of the electrolyte additive is not particularly limited so long as the electrolyte additive is decomposed within the above-described potential range to form an electrode surface layer. For example, the electrolyte additive may be at least one selected from the group consisting of a phenyl group-containing compound, a benzyl group-containing compound, and a substituted or unsubstituted $C_4$-$C_7$ heterocyclic compound.

More specifically, the phenyl group-containing compound may be any compound that contains a phenyl group. Specifically, the phenyl group-containing compound may be biphenyl, o-terphenyl, or benzene substituted with a $C_4$-$C_7$ cyclic compound, and, more specifically, may be diacetoxy biphenyl or cyclohexyl benzene.

The benzyl group-containing compound may be any compound that contains a benzyl group, for example, bibenzyl or dibenzyl.

In the present embodiment, the heterocyclic compound, which is a cyclic compound substituted with a hetero atom such as nitrogen (N), sulfur (S), oxygen (O), or the like, may be an aromatic group containing at least one heterocyclic ring. In this regard, examples of substituents include, but are not limited to, hydrogen, a substituted or unsubstituted $C_1$-$C_{10}$ alkyl group, a substituted or unsubstituted $C_1$-$C_{10}$ alkenyl group, a substituted or unsubstituted $C_1$-$C_{10}$ alkynyl group, and a substituted or unsubstituted $C_1$-$C_{10}$ alkoxy group. In particular, the heterocyclic compound may be a $C_4$-$C_5$ heterocyclic compound and, more particularly, may be a compound having Formula 1 below:

(1)

wherein X is NR, O, or S, wherein R may be hydrogen, a substituted or unsubstituted $C_1$-$C_{10}$ alkyl group, a substituted or unsubstituted $C_1$-$C_{10}$ alkenyl group, a substituted or unsubstituted $C_1$-$C_{10}$ alkynyl group, and a substituted or unsubstituted $C_1$-$C_{10}$ alkoxy group.

The cathode may be manufactured by coating a mixture of a cathode active material, a conductive material, and a binder on a cathode current collector and drying and pressing the coated cathode current collector. The mixture may further include a filler as desired.

The cathode current collector is generally fabricated to a thickness of 3 to 500 μm. The cathode current collector is not particularly limited so long as it does not cause chemical changes in the fabricated secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between a cathode active material and the cathode current collector. In addition, the cathode current collector may be used in any of various forms including films, sheets, foils, nets, porous structures, foams, and non-woven fabrics.

Examples of the cathode active material include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \leq x \leq 0.33$, $LiMnO_3$, $Li_2MnO_3$, $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some of the Mn atoms are substituted with alkaline earth metal ions; disulfide compounds; and $Fe_2(MoO_4)_3$. Specifically, the cathode active material may be a spinel-structure lithium metal oxide represented by Formula 1 below:

$$Li_xM_yMn_{2-y}O_{4-z}A_z \quad (1)$$

wherein $0.9 \leq x \leq 1.2$, $0 < y < 2$, and $0 \leq z < 0.2$; M refers to at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

More specifically, the spinel-structure lithium metal oxide may be represented by Formula 2 below:

$$Li_xNi_yMn_{2-y}O_4 \quad (2)$$

wherein $0.9 \leq x \leq 1.2$ and $0.4 \leq y \leq 0.5$.

More particularly, the spinel-structure lithium metal oxide may be
$LiNi_{0.5}Mn_{1.5}O_4$ or $LiNi_{0.4}Mn_{1.6}O_4$.

That is, the spinel-structure lithium nickel manganese composite oxide is an active material for high voltage application, i.e., 4.7 V or higher vs. reduction voltage of $Li^+$ and thus can oxidize a non-aqueous electrolyte. When the electrolyte additive according to the present invention is used, however, the electrolyte additive is decomposed at 4.5 V or higher vs. reduction voltage of Li to form a stable electrode surface layer and thus additional oxidation due to reaction between the electrode and the electrolyte may be prevented.

The conductive material is typically added in an amount of 1 to 50 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between the electrode active material and the conductive material and in binding of the electrode active material to the cathode current collector. The binder is typically added in an amount of 1 to 50 wt % based on the total weight of the mixture including the cathode active material. Examples of the binder include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

Meanwhile, the anode may be manufactured by coating an anode active material on an anode current collector and drying and pressing the coated anode current collector. In some cases, the conductive material, the binder, the filler, or the like may be optionally further coated on the anode current collector.

An anode current collector is typically fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and an anode active material. In addition, the anode current collector may be used in various forms including films, sheets, foils, nets, porous structures, foams, and non-woven fabrics.

Examples of the anode active material include carbon such as hard carbon and graphite-based carbon; metal composite oxides such as $Li_xFe_2O_3$ where $0 \leq x \leq 1$, $Li_xWO_2$ where $0 \leq x \leq 1$, and $Sn_xMe_{1-x}Me'_yO_z$ where Me: Mn, Fe, Pb or Ge; Me': Al, B, P, Si, Group I, Group II and Group III elements, or halogens; $0 < x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials. In particular, a lithium metal oxide represented by Formula 3 below may be used.

$$Li_aM'_bO_{4-c}A_c \quad (3)$$

wherein M' is at least one element selected from the group consisting of Ti, Sn, Cu, Pb, Sb, Zn, Fe, In, Al, and Zr; $0.1 \leq a \leq 4$ and $0.2 \leq b \leq 4$ wherein a and b are determined according to oxidation number of M'; $0 \leq c \leq 0.2$ wherein c is determined according to oxidation number of A; and A is at least one monovalent or divalent anion.

The lithium metal oxide of Formula 3 may be represented by Formula 4 below:

$$Li_aTi_bO_4 \qquad (4)$$

More particularly, the lithium metal oxide may be $Li_{1.33}Ti_{1.67}O_4$ or $LiTi_2O_4$.

That is, when lithium titanium oxide (LTO) is used as the anode active material, the above-described electrode structure may be obtained since LTO has low electrical conductivity. In addition, in this case, a spinel-structure lithium manganese composite oxide having the formula $LiNi_xMn_{2-x}O_4$ where x=0.01 to 0.6, which has a relatively high potential due to high potential of LTO, may be used as the cathode active material.

The separator is disposed between the cathode and the anode and, as the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing electrolyte is composed of an electrolyte and a lithium salt. As the electrolyte, a non-aqueous organic solvent, an organic solid electrolyte, or an inorganic solid electrolyte may be used, but embodiments of the present invention are not limited thereto.

For example, the non-aqueous organic solvent may be an aprotic organic solvent such as N-methyl-2-pyrrolidone, propylene carbonate, ethylene carbonate, butylene carbonate, dimethyl carbonate; diethyl carbonate, gamma butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

In one embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent including EC or PC, which is a high dielectric solvent and a cyclic carbonate, and DEC, DMC, or EMC, which is a low viscosity solvent and a linear carbonate.

In one embodiment, the LTO as an anode active material has a potential of 1.5 V vs. lithium and thus the potential of the LTO is within the potential range in which the electrolyte additive is decomposed. In addition, the potential of the LTO tends to dramatically decrease during 100% charge and thus the LTO may be used in combination with the electrolyte additive having a potential of 0.5 V to 1.8 V.

The present invention also provides a battery module including the secondary battery as a unit cell and a battery pack including the battery module.

The battery pack may be used as a power source for medium and large devices that require stability at high temperature, long cycle life, and high rate characteristics.

Examples of such medium and large devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

Effects of Invention

As apparent from the fore-going, an electrolyte additive for a secondary battery according to the present invention is decomposed at 4.5 V or higher to less than 5.5 V vs. reduction voltage of $Li^+$ and thus forms an electrode surface layer, whereby additional oxidation of an electrolyte due to reaction between an electrode and the electrolyte may be prevented and thus safety and lifespan characteristics of the secondary battery may be enhanced.

BRIEF DESCRIPTION OF THE DRAWINGS

The above and other objects, features and other advantages of the present invention will be more clearly understood from the following detailed description taken in conjunction with the accompanying drawing, in which.

BEST MODE

Now, the present invention will be described in more detail with reference to the following examples. These examples are provided only for illustration of the present invention and should not be construed as limiting the scope and spirit of the present invention.

Example 1

Diacetoxy biphenyl as an additive was added to a lithium non-aqueous electrolyte containing 1 M $LiPF_6$ in a mixed solvent of ethylene carbonate (EC): dimethyl carbonate (DMC): ethylmethyl carbonate (EMC) in a volume ratio of 1:1:1, in an amount of 0.5 wt % based on the total weight of the lithium non-aqueous electrolyte, to prepare an electrolyte for a secondary battery.

90 wt % of $LiNi_{0.5}Mn_{1.5}O_4$ as a cathode active material, 5 wt % of Super-P as a conductive material, and 5 wt % of PVdF as a binder were added to NMP to prepare a cathode composite material, the cathode composite material was coated on an Al current collector, and the coated Al current collector was dried and pressed, thereby completing manufacture of a cathode for a secondary battery.

Separately, 83 wt % of $Li_4Ti_5O_{12}$ as an anode active material, 5 wt % of Super-P as a conductive material, and 12 wt % of PVdF as a binder were added to NMP to prepare an anode composite material, the anode composite material was coated on an Al current collector, and the coated Al current collector was dried and pressed, thereby completing manufacture of an anode.

Thereafter, a porous separator made of polypropylene was disposed between the cathode and the anode to manufacture an electrode assembly, the electrode assembly was placed in a pouch to which lead wires were then connected, and the electrolyte for a secondary battery was injected into the pouch, followed by sealing the pouch, thereby completing assembly of a secondary battery.

Example 2

A secondary battery was manufactured in the same manner as in Example 1, except that cyclohexyl benzene was used as the additive in an amount of 0.5 wt % based on the total weight of the electrolyte.

Comparative Example 1

A secondary battery was manufactured in the same manner as in Example 1, except that the additive used in Example 1 was not used.

Comparative Example 2

A secondary battery was manufactured in the same manner as in Example 1, except that cyclohexyl benzene was used as the additive in an amount of 2 wt % based on the total weight of the electrolyte.

Experimental Example 1

To measure lifespan characteristics, the secondary batteries manufactured according to Examples 1 and 2 and Comparative Examples 1 and 2 were subjected to 20 cycles, each cycle consisting of charge in a constant voltage/constant current (CV/CC) manner and discharge in a CC manner. Measurement results are illustrated in FIG. 1.

Figure 1:
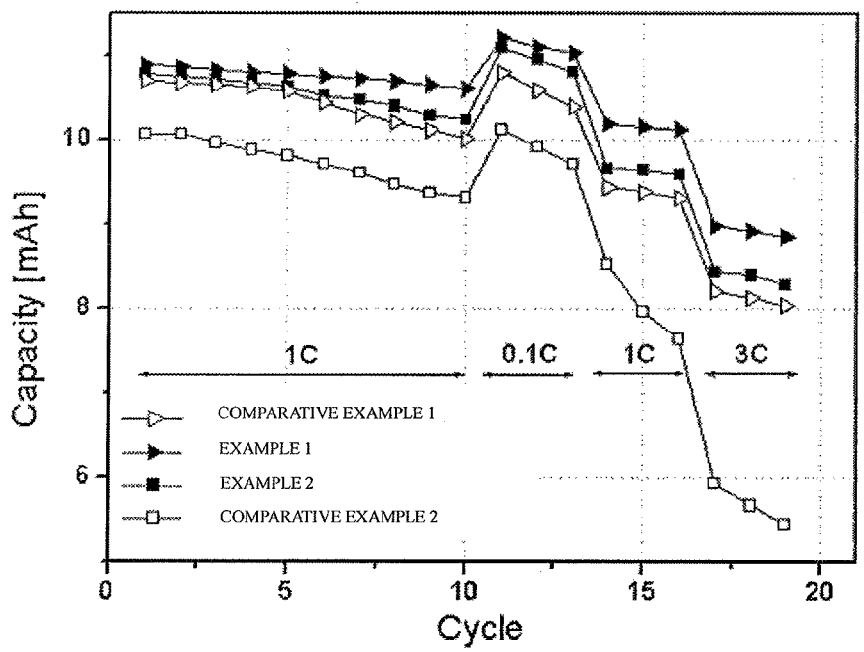
FIG. 1 is a graph showing changes in capacity according to cycling of secondary batteries according to Experimental Example 1.
Figure 2:
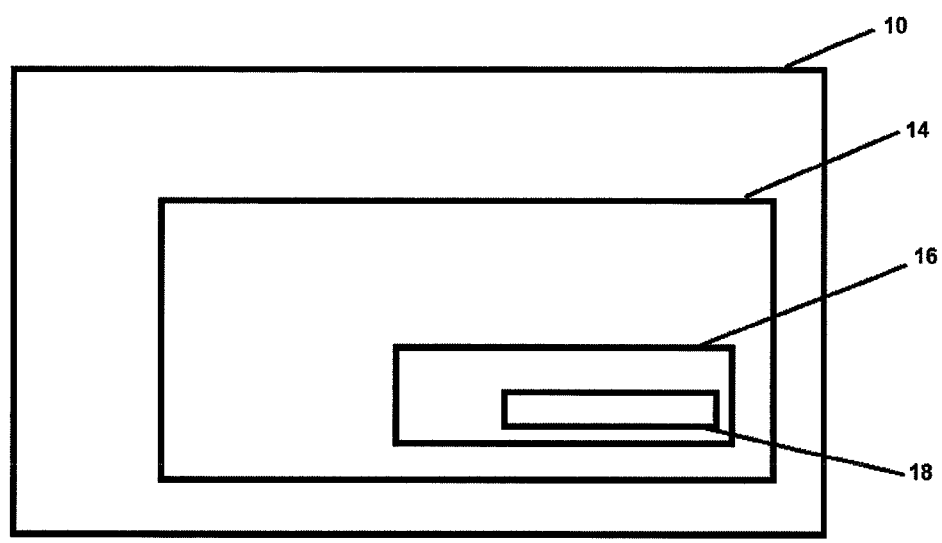
FIG. 2 depicts a device 10 which comprises a battery pack 14 which further comprises a battery module 16 and even further comprises a secondary battery 18 as a unit cell.

Referring to FIG. 1, it can be confirmed that the secondary batteries of Examples 1 and 2 exhibit low capacity reduction rate according to cycling because the electrolyte additives included in the secondary batteries of Examples 1 and 2 are decomposed to form electrode surface layers and thus additional side reaction between the electrode and the electrolyte is suppressed, which results in suppressed electrolyte oxidation. By contrast, the secondary battery of Comparative Example 2 includes an excess of cyclohexyl benzene as an additive and thus has rather increased internal resistance, whereby battery performance is deteriorated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery comprising a cathode, an anode, and an electrolyte consisting of a lithium salt, a non-aqueous organic solvent, and an electrolyte additive, wherein the electrolyte additive decomposes at 4.5 V or higher to less than 5.5 V vs. reduction voltage of $Li^+$, wherein an amount of the electrolyte additive is in a range of 0.1 to 1 wt % based on a total weight of the electrolyte and the electrolyte additive consists of diacetoxy biphenyl or cyclohexyl benzene, wherein at least one of the cathode and the anode has a surface layer formed by decomposition of the electrolyte additive, and wherein the cathode comprises a spinel-structure lithium metal oxide as a cathode active material is represented by Formula 2 below, $$Li_xNi_yMn_{2-y}O_4 \quad (2)$$

wherein 0.9≤x≤1.2 and 0.4≤y≤0.5, and the anode comprises an anode active material represented by Formula 4 below:

$$Li_aTi_bO_4 \quad (4)$$

wherein 0.1≤a≤4 and 0.2≤b≤4.

2. The secondary battery according to claim 1, wherein an amount of the electrolyte additive is in a range of 0.1 to 0.6 wt % based on a total weight of the electrolyte.

3. The secondary battery according to claim 1, wherein the lithium metal oxide is $LiNi_{0.5}Mn_{1.5}O_4$ or $LiNi_{0.4}Mn_{1.6}O_4$.

4. A battery module comprising the secondary battery according to claim 1, as a unit cell.

5. A battery pack comprising the battery module according to claim 4.

6. A device comprising the battery pack according to claim 5.

7. The device according to claim 6, wherein the device is an electric vehicle, a hybrid electric vehicle, a plug-in hybrid electric vehicle, or a system for storing power.

* * * * *